UNITED STATES PATENT OFFICE.

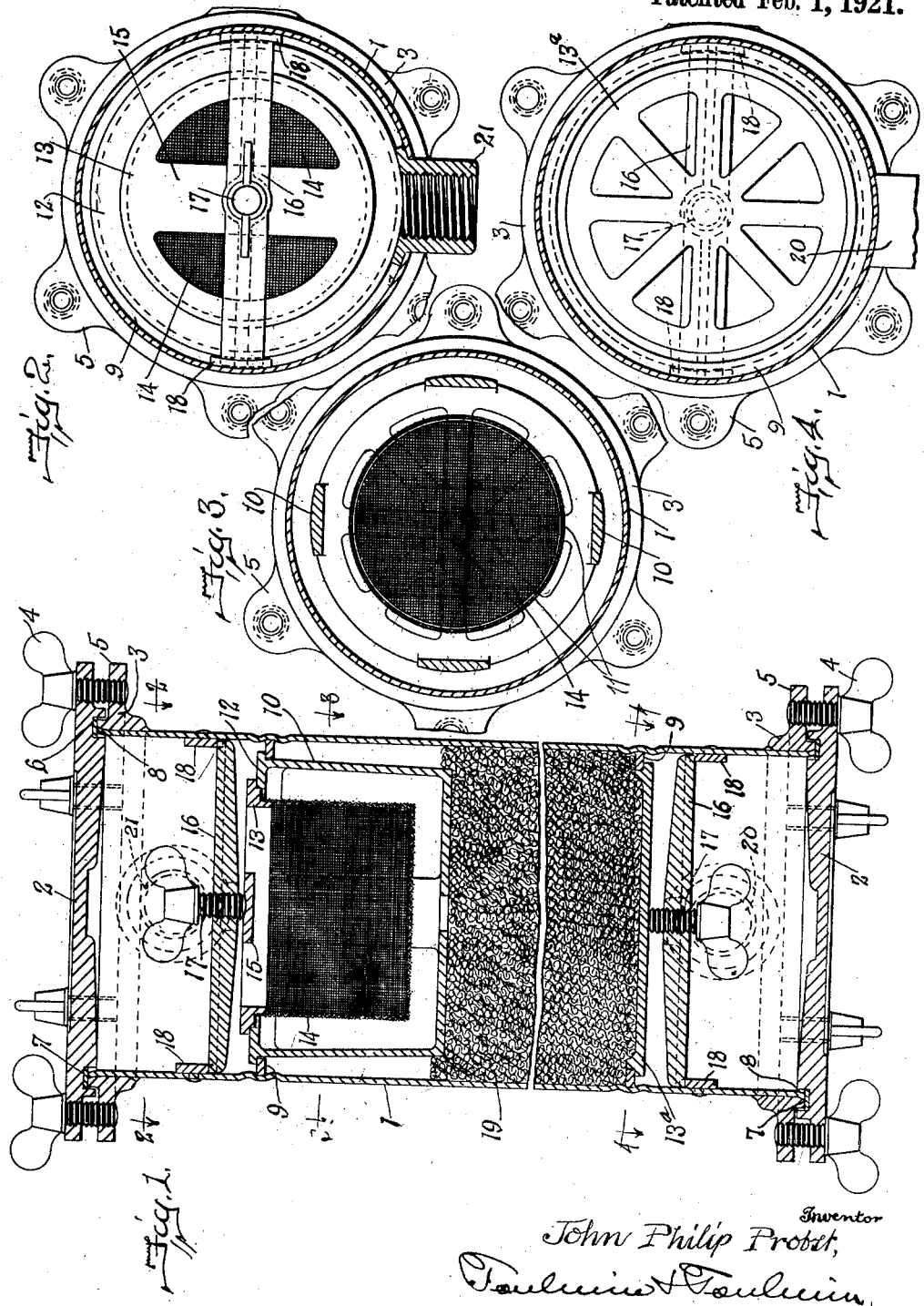

JOHN PHILIP PROBST, OF MARION, OHIO.

FILTER.

1,367,324.     Specification of Letters Patent.     Patented Feb. 1, 1921.

Application filed February 14, 1919. Serial No. 276,986.

*To all whom it may concern:*

Be it known that I, JOHN PHILIP PROBST, a citizen of the United States, residing at Marion, in the county of Marion and State of Ohio, have invented certain new and useful Improvements in Filters, of which the following is a specification, reference being had therein to the accompanying drawing.

This invention relates to filters and has for its object to provide certain important improvements in features of construction in filters of the type disclosed in Patent No. 1,247,875, issued to me November 27th, 1917.

The present invention goes to details of construction and has for its particular object to provide a filter of the character shown wherein simplicity and cheapness in construction are realized and a filter is produced which is in all respects admirably adapted to the intended purposes and conditions of use.

Filters of the character here shown are used to remove objectionable foreign matter from water used in buildings and dwellings, particularly for filtering rain water caught on roofs of buildings and confined in cisterns which usually contain a formation of impurities, commonly known as silt, which renders the water more or less unfit for drinking or cooking purposes before it is filtered. In practice it has been found advantageous to locate the filter at the exit of the water from the cistern, thus removing the foreign matter therefrom before the water is delivered to the dwelling for use.

In the accompanying drawings,

Figure 1 is a cross sectional view of my improved filter taken substantially through the vertical center thereof;

Fig. 2 is a horizontal cross section taken on the line 2—2 of Fig. 1;

Fig. 3 is a cross section taken on the line 3—3 of Fig. 1; and

Fig. 4 is a cross section taken on the line 4—4 of Fig. 1.

The general construction and arrangement of my present invention, as here shown, is similar to my earlier invention above referred to, but differs from my earlier invention in certain important details which tend to simplify, cheapen and otherwise improve the device.

As here shown the improved filter consists of a cylindrical-shaped metal casing 1 provided at its open ends at the top and bottom thereof with cover plates 2 which are secured to the casing 1 by means of an annular flange 3 and winged screws 4. The flange 3 is provided with projections 5 having threaded apertures therein to receive the screws 4, the flange being secured to the casing 1 in any suitable manner, as by brazing or welding.

To form a substantially water-tight joint between the ends of the casing and the cover plates 2, the plates are provided with an annular groove 6 which may be provided with any suitable packing material 7. The flange member 3 is preferably slightly countersunk and the ends of the casing 1 are correspondingly flared outwardly, as shown at 8, whereby the flange is held more securely to the casing and a tight joint is obtained.

Suspended within the casing, adjacent the upper end thereof from an annular flange 9 is a filter well 10 having its bottom wall webbed as at 11, and having open spaces in its side walls, as shown in Figs. 1 and 3, and having an inwardly extending flange 12 at its upper end. Resting upon the flange 12 and suspended within the well 10 from an annular flanged frame or ring 13 is a cylindrical-shaped screen 14 which acts to screen the coarser foreign substances from the water as it passes therethrough. The frame 13 is provided with a strip of metal 15 extending across the central portion thereof. Disposed above the frame 13 at right angles to the strip 15 and extending diametrically across the cylinder is a brace 16 having secured therein a wing screw 17 by means of which the ring 13 and the screen suspended thereon is held in fixed relation to the supporting flange 12 of the well 10.

The brace 16 is limited in its upward movement by plates 18 pivotally secured to the casing 1 in any suitable manner which are notched or bifurcated at their lower ends to receive the ends of the bar 16 and to prevent lateral movement thereof. Thus it will be seen that the screw 17 will act to hold the screen in fixed relation to the well 10. To remove the screen the screw 17 is retracted until it is free of the cross strip 15; the brace 16 may then be moved laterally and upwardly, or rotatively with the pivoted plates 18 whereby sufficient clearance space is provided between the brace and the screen to admit of the removal of the screen from its supporting frame.

The annular flange 9 is supported in fixed relation to the casing 1 by compressing the walls of the casing on opposite sides of the flange inwardly, as shown in Fig. 1, thus acting to support the flange in fixed relation to the well 10. The flange may be further secured to the casing by welding or brazing, but for the purposes of the present application of the invention the compression of the casing walls is sufficient to retain the flange in position.

The space in the cylinder between the lower end of the well 10 and the opposite plate 13ª, as here shown, may be filled with any suitable filtering material, such as packed sponges 19 which, as has been found, are very effective in removing the foreign substances from the water as it filters therethrough.

It will be observed that with the exception of the screen 14 and well 10 the arrangement at both ends of the filter cylinder is the same.

In the present embodiment of the invention it is contemplated to cause the water to enter the filter at the bottom, and to pass upwardly through filtering material and out at the top. To this end an inlet port 20 and an outlet port 21 are provided. As the water moves upwardly under pressure through the filtering sponges the silt and other foreign substances are separated from the water, the fine screen gauze of the filter device 14 acting to remove any remaining portions of foreign substances from the water after it has passed through the sponges.

It will be obvious from the described construction that the screen 14 may be located in either end of the casing 1 and that the casing may then be reversed as to its ends, all the parts affected by such a change being interchangeable.

As here shown my construction provides a very efficient filter which will not clog. The filter is so constructed that it can be placed on a suction line, discharge line, or water service line, without resistance in pressure; also can be used on a gravity flow line or can be attached to the spout of a pump or any source of water supply.

When it is desired to clean out the device or replace the filtering material the cover plates 2 are removed, the winged screws 17 are raised and the bars 16 are turned upon the pivoted plates 18 until they can be lifted upwardly therefrom. The screen and well and sponge material may then each be removed without obstruction.

Having thus fully described my invention, what I claim as new and desire to secure by Letters Patent, is:—

1. In a filter, the combination, with a casing having its wall compressed on opposite sides of the center of the casing, of an annular flange supported within the casing in each of said compressions, interchangeable supports coöperating with the respective flanges, and filter material in the casing between said supports.

2. In a filter, the combination, with a casing having its wall compressed on opposite sides of the center of the casing, of an annular flange supported within the casing in each of said compressions, removable, interchangeable supports coöperating with the respective flanges, and filter material in the casing between said supports.

3. In a filter, the combination, with a casing having its wall compressed on opposite sides of the center of the casing, of an annular flange supported within the casing in each of said compressions, interchangeable supports comprising removable braces arranged transversely in the filter casing and coöperating with the respective flanges, and filter material in the casing between said supports.

4. In a filter, the combination, with a casing having its wall compressed on opposite sides of the center of the casing, of an annular flange supported within the casing in each of said compressions, removable, interchangeable supports coöperating with the respective flanges, a cylindrical filter screen mounted in one of said supports, and filter material in the casing between said supports.

5. In a filter, the combination, with a casing having its wall compressed on opposite sides of the center of the casing, of an annular flange supported within the casing in each of said compressions, removable, interchangeable supports coöperating with the respective flanges, a cylindrical filter screen mounted in one of said supports and adapted to be interchangeably mounted relative to said flanges, and filter material in the casing between said supports.

In testimony whereof I affix my signature.

JOHN PHILIP PROBST.